(12) United States Patent
Abedini et al.

(10) Patent No.: US 12,143,959 B2
(45) Date of Patent: Nov. 12, 2024

(54) ACQUIRING LOCATION INFORMATION OF AN ASSISTING TRANSMISSION AND RECEPTION POINT (TRP)

(71) Applicant: QUALCOMM Incorporated, San Diego, CA (US)

(72) Inventors: Navid Abedini, Basking Ridge, NJ (US); Naeem Akl, Somerville, NJ (US); Jianghong Luo, Skillman, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 17/406,921

(22) Filed: Aug. 19, 2021

(65) Prior Publication Data

US 2023/0058050 A1 Feb. 23, 2023

(51) Int. Cl.
*H04W 64/00* (2009.01)
(52) U.S. Cl.
CPC ................ *H04W 64/003* (2013.01)

(58) Field of Classification Search
CPC ................................... H04W 64/003
See application file for complete search history.

(56) References Cited

U.S. PATENT DOCUMENTS

2023/0283424 A1* 9/2023 Rao .............. H04L 5/0053
370/329
2023/0354250 A1* 11/2023 Shimoda ............. H04W 64/00

* cited by examiner

*Primary Examiner* — Justin Y Lee
(74) *Attorney, Agent, or Firm* — QUALCOMM Incorporated

(57) ABSTRACT

Certain aspects of the present disclosure provide techniques for acquiring location information of an assisting node, such as an assisting transmission and reception point (TRP). The location information may include geographical location information as well as spatial information. The location information may be used to facilitate positioning and other purposes, such as beam management, interference management, and sensing between one or more assisting TRPs and one or more network entities (e.g., a gNodeB (gNB), a user equipment (UE), a central unit (CU), or a distributed unit (DU)). To achieve these purposes, accurate locations of the assisting TRPs are needed. The present disclosure provides techniques for acquiring and exchanging the accurate location information of such assisting TRPs.

40 Claims, 9 Drawing Sheets

ACQUIRING LOCATION INFORMATION OF AN ASSISTING TRANSMISSION AND RECEPTION POINT (TRP)

INTRODUCTION

Aspects of the present disclosure relate to wireless communications, and more particularly, to techniques for acquiring location information of transmission and reception points (TRPs).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communications by a first network entity. The method includes identifying an assisting transmission-reception-point (TRP) associated with the first network entity. The method includes acquiring location information of the assisting TRP. The method further includes transmitting the acquired location information to a second network entity.

One aspect provides a method for wireless communications by an assisting TRP. The method includes associating with a first network entity; and transmitting an indication of location information to the first network entity upon association with the first network entity.

One aspect provides a first network entity for wireless communications. The first network entity includes a memory and a processor coupled to the memory. The processor and memory are configured to identify an assisting transmission-reception-point (TRP) associated with the first network entity. The processor and memory are further configured to acquire location information of the assisting TRP. The location information includes at least one of geographical information or spatial information. The processor and memory are configured to transmit the acquired location information to a second network entity.

One aspect provides a non-transitory computer readable medium storing instructions that when executed by a first network entity cause the first network entity to: identify an assisting transmission-reception-point (TRP) associated with the first network entity and acquire location information of the assisting TRP. The location information includes at least one of geographical information or spatial information. The non-transitory computer readable medium further stores instructions, when executed, cause the first network entity to transmit the acquired location information to a second network entity.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Figure 1:
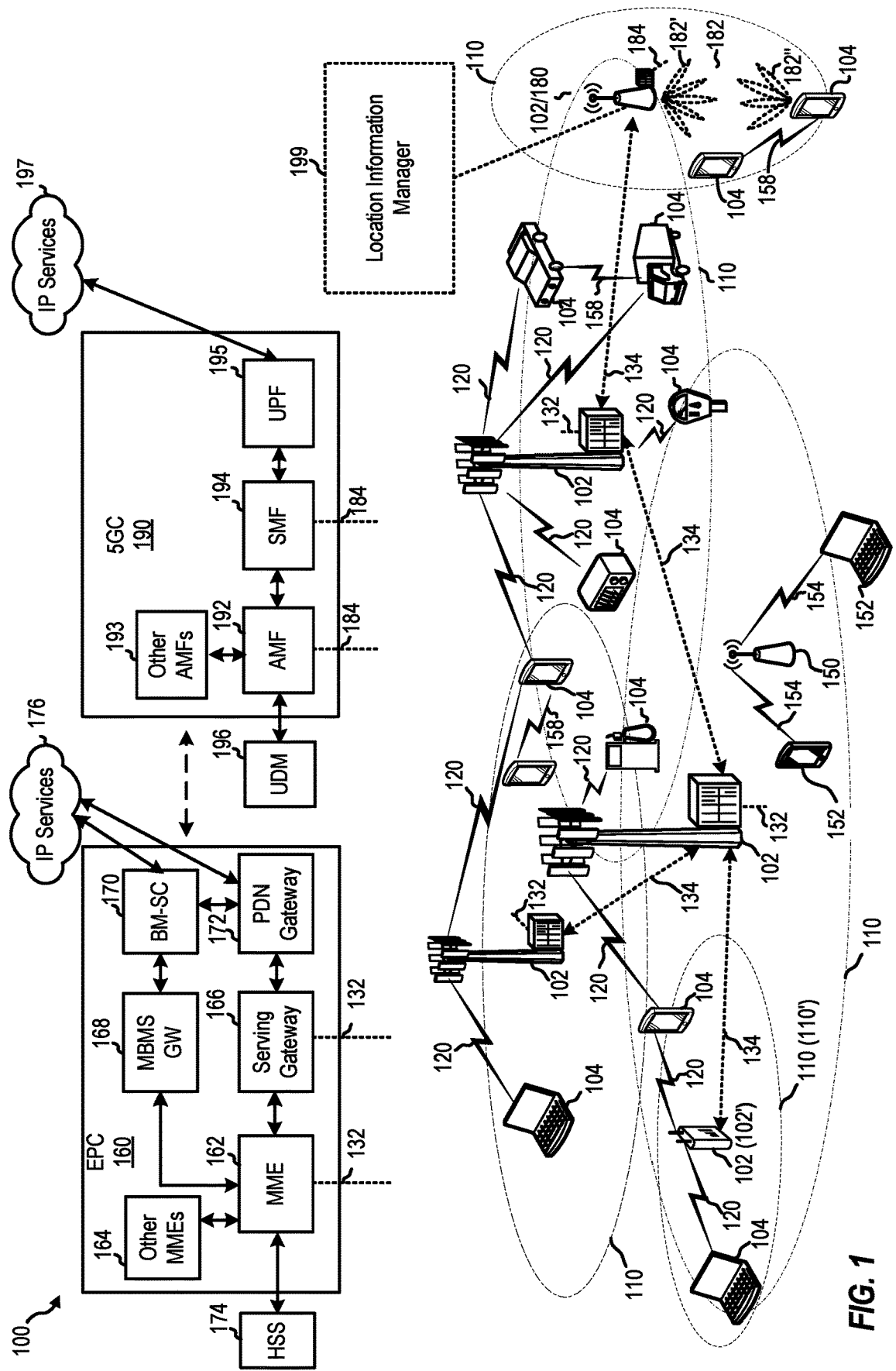
FIG. 1 is a block diagram conceptually illustrating an example wireless communication network.

Aspects of the present disclosure provide apparatuses, methods, processing systems, and computer-readable mediums for acquiring location information of an assisting node, such as an assisting transmission and reception point (TRP). The location information may include geographical location information as well as spatial information. The location information may be used to facilitate positioning and other purposes, such as beam management, interference management, and sensing between one or more assisting TRPs and one or more network entities (e.g., a gNodeB (gNB), a user equipment (UE), a central unit (CU), or a distributed unit (DU)). To achieve these purposes, accurate locations of the assisting TRPs are needed. The present disclosure provides techniques for acquiring and exchanging the accurate location information of such assisting TRPs.

TRPs may be referred to as assisting because they may be deployed and used to extend the coverage between communicating nodes (e.g., a gNB and a UE), increase reliability and/or improve throughput. In some cases, an assisting TRP may include a signal repeater or a signal reflector, which is used to improve existing coverage of the network entity the assisting TRP associated with, or to provide alternative paths to improve reliability or capacity. The location information is important for facilitating the integration or use of the assisting TRP with the network entity.

Known TRP information exchange procedures are often limited to one network entity inquiring information of a TRP from another network entity. For example, a CU may transmit a request for TRP information to a DU to obtain the TRP information. The DU then transmits a response of the TRP information to the CU, to provide the requested information. The requested information may include location information that facilitates the CU to communicate with the TRP. Such procedures may be limiting, however, when the DU may need to separately acquire the location information of the assisting TRP that is mobile and/or transient to the network. For example, the assisting TRP associated with the DU may be constantly changing in position and/or orientation (collectively referred to as the location information), such that when the DU receives the request from the CU, the DU itself may not have the latest location information of the assisting TRP. Furthermore, the CU may not know when or whether it should inquire information from the DU before communicating with the TRP, especially when the assisting TRP has varying location information from time to time. Therefore, acquiring the TRP location information notwithstanding these limitations may be desirable for improving or optimizing the use cases of assisting TRPs.

The present disclosure provides techniques, devices, and systems for acquiring and exchanging location information of an assisting TRP (or any assisting node that is deployed to extend communicating nodes coverage or that provides alternative paths to improve reliability or capacity of the communicating nodes). For example, an assisting node, mobile or stationary, may join a network as a wireless TRP when certain aspects of the network may be enhanced by the assisting node. Examples of an assisting node include a signal repeater, a lower-layer relay, a signal reflector such as a reconfigurable intelligent surface (RIS), a wireless remote unit (RU), or other simple network nodes or nodes that provide assistance. The present disclosure provides techniques for acquiring and exchanging the location information of assisting TRPs, for improving positioning, beam management, interference management, sensing, and other application aspects of assisting TRPs.

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. The BS 180 and the UE 104 may be referred to as assisting TRPs or assisting nodes herein. The base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes location information manager 199, which may be configured to acquire and manage location information of assisting TRPs. For example, the exchange manager 199 may perform operations 600 and 700 of FIGS. 6-7.

Figure 2:
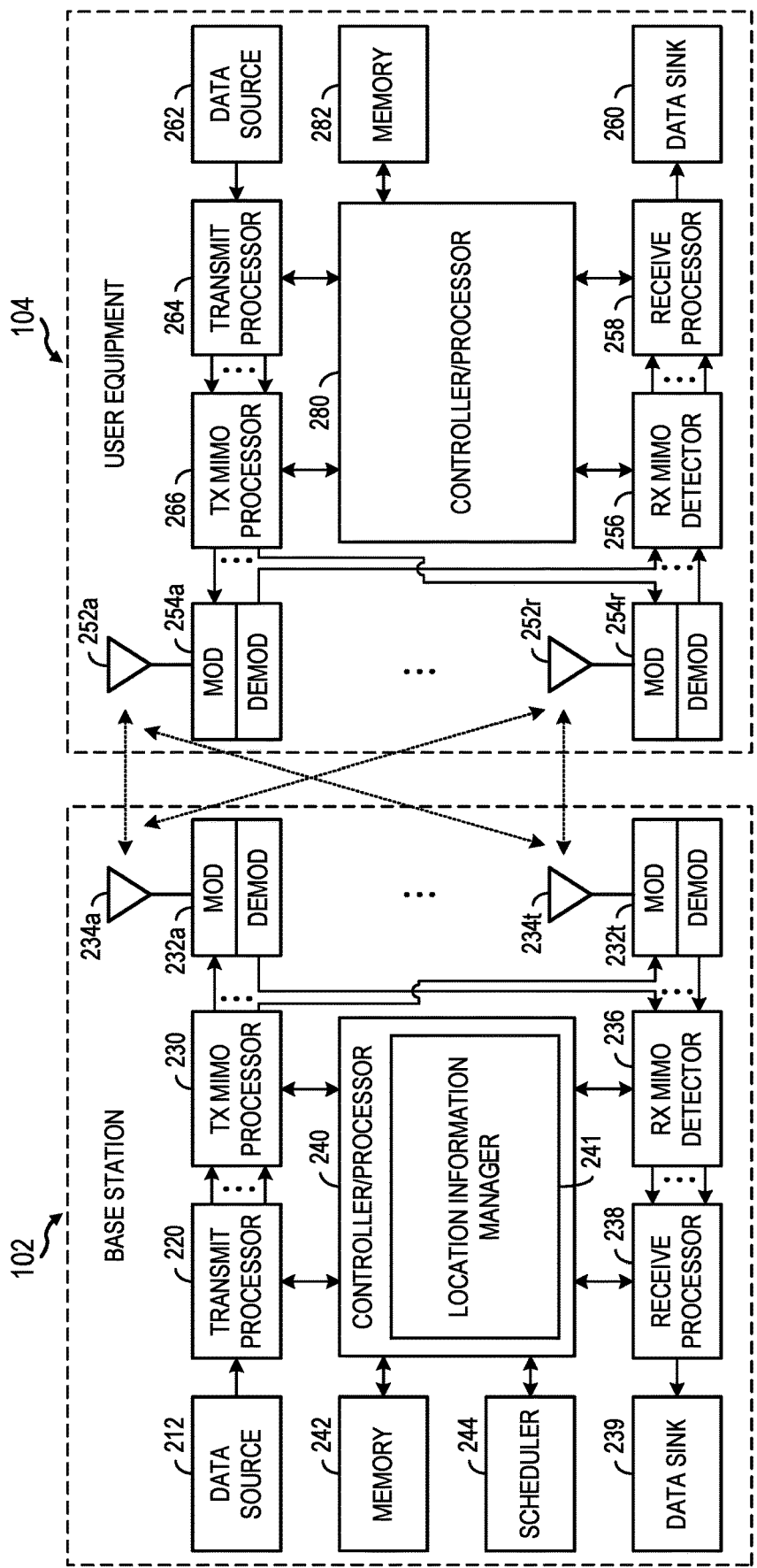
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes location information manager 241, which may be representative of location information manager 199 of FIG. 1. Notably, while depicted as an aspect of controller/processor 240, location information manager 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280, which may perform operations in response to or in concert with the base station 102.

Figure 3:
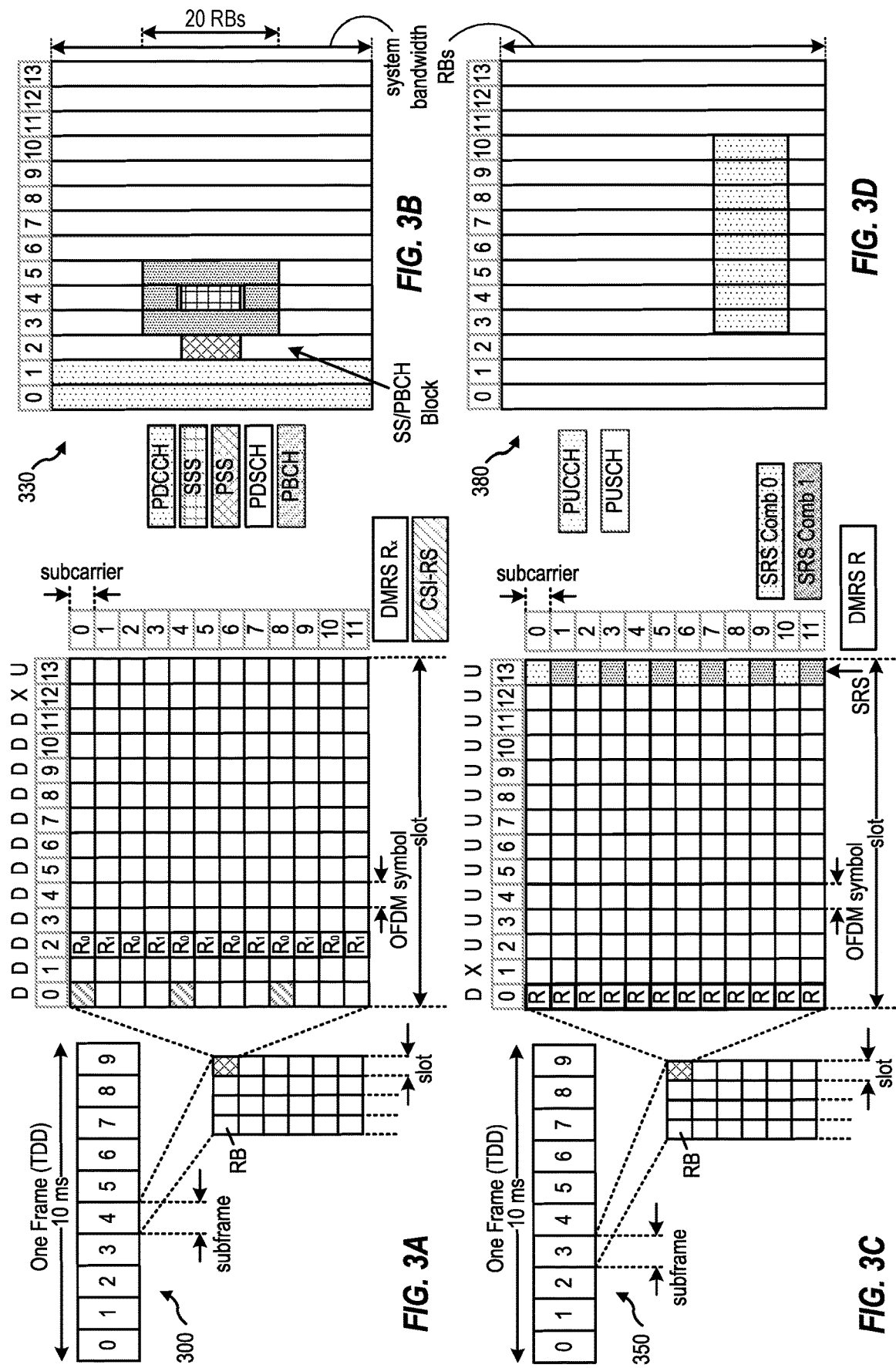
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Further, as described herein, assisting nodes may be used to enhance or improve mmWave wireless communications. For example, assisting nodes include signal repeaters that actively boost signal strength between UEs and BSs, as well as signal reflectors that passively increase signal quality (e.g., signal to noise ratio) by overcoming obstacles and interferences. Signal repeaters often enlarges area of coverage by amplifying and transmitting signals received therein, in order to reduce gaps in BS deployments or signal decay by obstacles. Signal repeaters help solving mmWave challenges in signal propagation, signal blocking, path loss, and latency. Signal repeaters may also be referred to as signal boosters, signal relays, or antennas.

Signal reflectors may change beam directions of mmWave, thus overcoming obstacles that block or reduce signals. Examples of signal reflectors include reconfigurable intelligent surfaces (RIS). A RIS may include a number of elements (referred to as RIS elements), which form a surface that may be integrated into different objects such as walls, sidings, clothes, etc. The RIS elements are reconfigurable scatterers, including antennas that receive and re-radiate (e.g., reflect or refract) radio wave signals. The RIS elements may be passive (e.g., differing from antenna elements of the network entity, though both may change beamforming directions, either actively or passively). When the RIS elements are passive, no external power is required for the re-radiation, and such that the re-radiation is configurable with a phase shift for each RIS element. The RIS element may also be active, such that the re-radiation may change the amplitude in addition to the phase shift. The RIS elements may therefore perform constructive interference that resembles beamforming and re-radiate beams in certain directions from a transmitter (e.g., a UE or BS) toward a receiver (e.g., a BS or UE).

The assisting node may also include a wireless remote unit (RU), such as a remote radio head or remote radio unit. The RU is a radio transceiver connecting to an operator control panel via electrical or wireless interface for extending the coverage of a NodeB (e.g., eNB or gNB) in challenging situations such as rural areas or tunnels. These different examples of assisting nodes may collectively be considered as an assisting TRP or wireless TRP that provides different features for enhancing wireless communication networks.

Aspects Related to Acquiring Location Information of an Assisting Transmission and Reception Point (TRP)

The present disclosure provides techniques for acquiring and exchanging accurate location information of assisting TRPs. Different assisting TRPs may be deployed or used to extend the coverage between communication nodes or various network entities (e.g., gNB, UE, and others), or to provide alternative paths for reliability or capacity improvement. In aspects, the location information of assisting TRPs may facilitate positioning, beam management, interference, and sensing in network entities. In certain aspects, the network entities may be different units in a split architecture as shown in FIG. 4, or between logical nodes such as a new radio (NR) radio access network (RAN) node and a location management function (LMF), as further discussed below.

Figure 4:
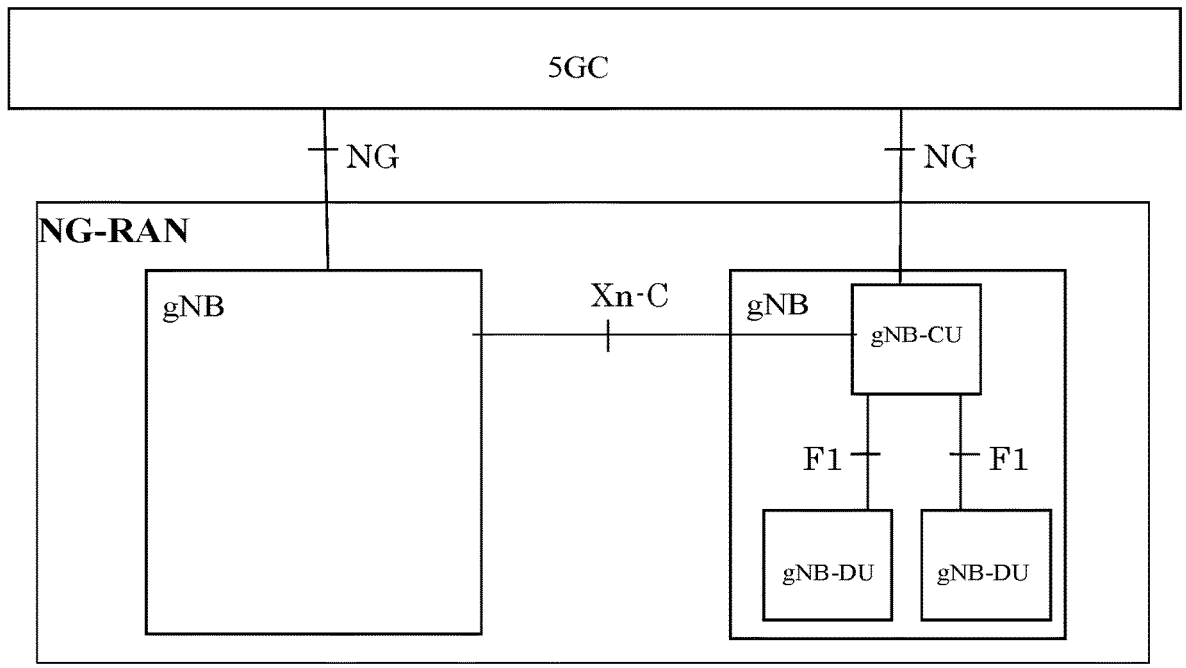
FIG. 4 depicts an example network architecture.

FIG. 4 depicts an example network architecture 400 illustrating a central unit (CU) and distributed unit (DU) split architecture. As shown, the 5G core network (5GC) is connected with the NG-RAN via NG interface. The gNB within the NG-RAN may include a single logical node as shown on the left, or a collection of CU and DUs as shown on the right. A CU is a logical node hosting radio resource control (RRC), service data adaptation protocol (SDAP), and packet data convergence protocol (PDCP) of the gNB that controls the operation of one or more DUs. A DU is a logical node hosting radio link control (RLC), medium access control (MAC), and physical layers (PHY) of the gNB. The CU and DUs may be connected via F1 interfaces using F1 application protocol for conveying lower-layer configuration information of the radio bearers between CU and DU. By splitting the CU and DU functions as shown, time-critical functionalities, including scheduling, retransmission, segmentation, etc. may be realized in the DU that is close to the radio and the antenna. Other functionalities, such as centralizing, resource-pooling, etc. may then be performed in the CU. Therefore, the split architecture allows CU and DUs to achieve low latency and high-throughput communications.

Other benefits may be achieved using the split architecture. For example, external interfaces of the gNB, such as the interface between neighboring gNBs, may be terminated in the CU and avoid potential complexities of terminating the external interfaces to every DU. Similarly, the centralized termination of PDCP may facilitate secure communication between the UE and the CU.

When an assisting TRP is connected to a DU, the CU may transmit a TRP information request to the DU for obtaining information of the TRP. For example, the TRP information may include a TRP identifier (ID), which may be one of sixty five thousand unique IDs within a gNB-CU. The TRP information may also include an NR physical cell ID (PCI), an NR cell global identity (CGI), an NR absolute radio-frequency channel number (ARFCN), positioning reference signal (PRS) configuration, and synchronization signal block (SSB) information. The SSB information may include a list of up to 255 elements. Each of the elements may include a pair of PCI and SSB configuration. The SSB configuration may include SSB transmission power and other relevant information.

The TRP information may further include system frame number (SFN) initiation time, spatial direction information (e.g., related to beamforming), geographical coordinates, and other TRP information. The spatial direction information may include PRS beam information, such as azimuth and elevation angle of each PRS (e.g., accurate to 0.1 degree). The geographical coordinates may use the NG-RAN access point position for identifying the geographical position of the NG-RAN access point or TRP reference points. As such, the TRP information include various values subject to change (e.g., when the TRP is mobile) and updating or exchanging the TRP information may improve the use of the TRPs.

Figure 5:
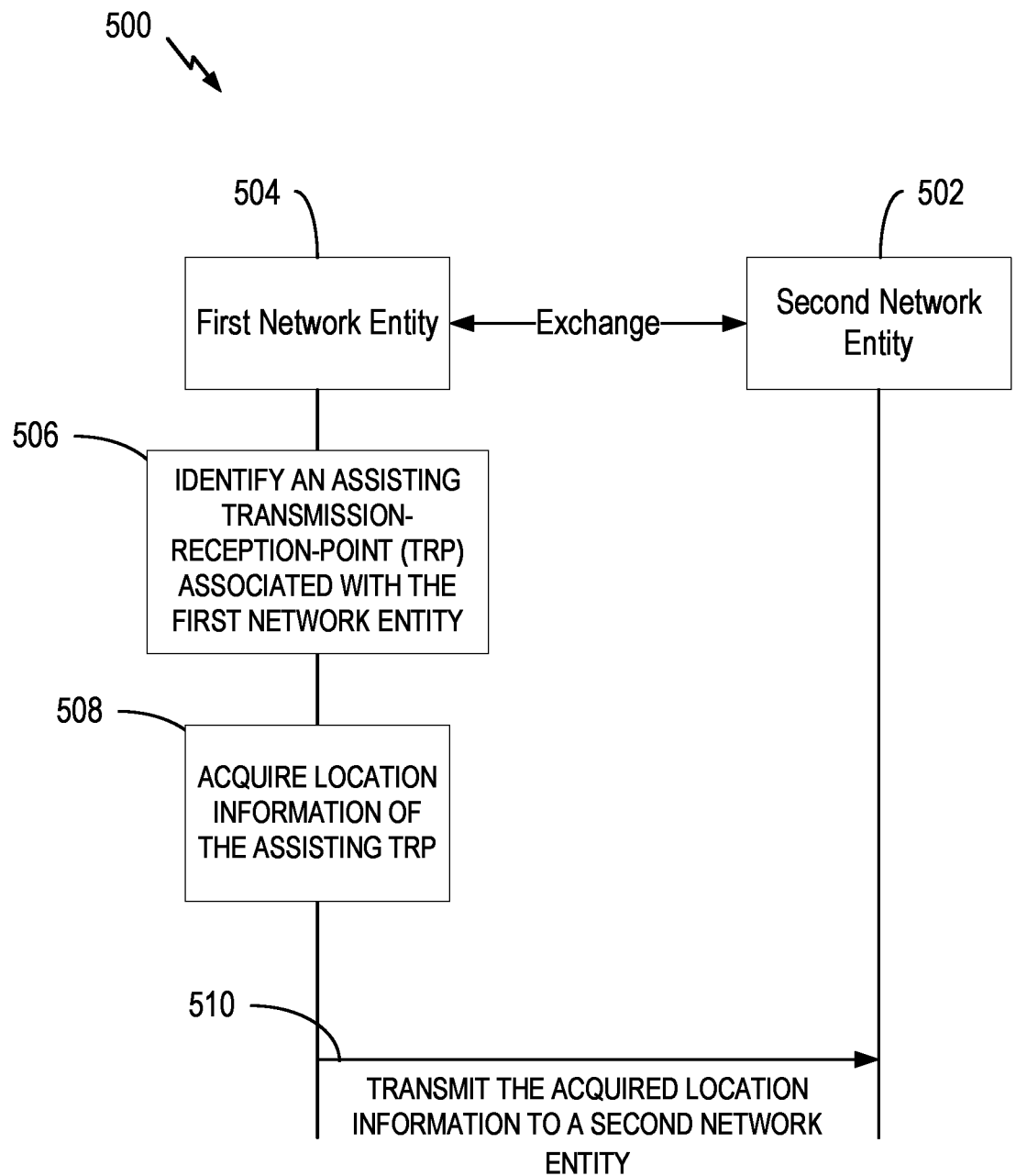
FIG. 5 depicts an example call flow diagram.

FIG. 5 depicts an example call flow diagram 500, according to aspects of the present disclosure. As shown, the first network entity 504 and the second network entity 502 may acquire and/or exchange location information on an assisting TRP. For example, the first network entity or the second network entity may include at least one of: a control unit (CU), a distributed unit (DU), a repeater or reflector management entity (RME), a location management function (LMF), or an operations, administration, and maintenance (OAM).

At 506, the first network entity may identify an assisting TRP associated therewith. For example, the first network entity may receive, from the assisting TRP, a global identifier (ID) of the assisting TRP. The global ID may enable the first network entity to obtain the location information associated with the assisting TRP. In some cases, the first network entity receives an ID of the assisting TRP from an OAM function or a TRP RME.

At 508, the first network entity acquires the location information of the assisting TRP, such as by using the ID obtained directly or indirectly mentioned above. For example, the ID of the assisting TRP corresponds to the location information associated with the assisting TRP stored in the OAM or the RME.

At 510, the first network entity transmits the acquired location information to the second network entity. In some cases, the transmission may be in response to receiving a request from the second network entity or another network entity. In some cases, the transmission may be initiated by the first network entity, which may select the second network entity such that the second network entity may benefit from using the location information of the assisting TRP. For example, the first network entity may attempt to use an alternative signal path enabled by the assisting TRP by transmitting the location information to the second network entity. Other use cases may be understood in view of the following discussion.

Figure 6:
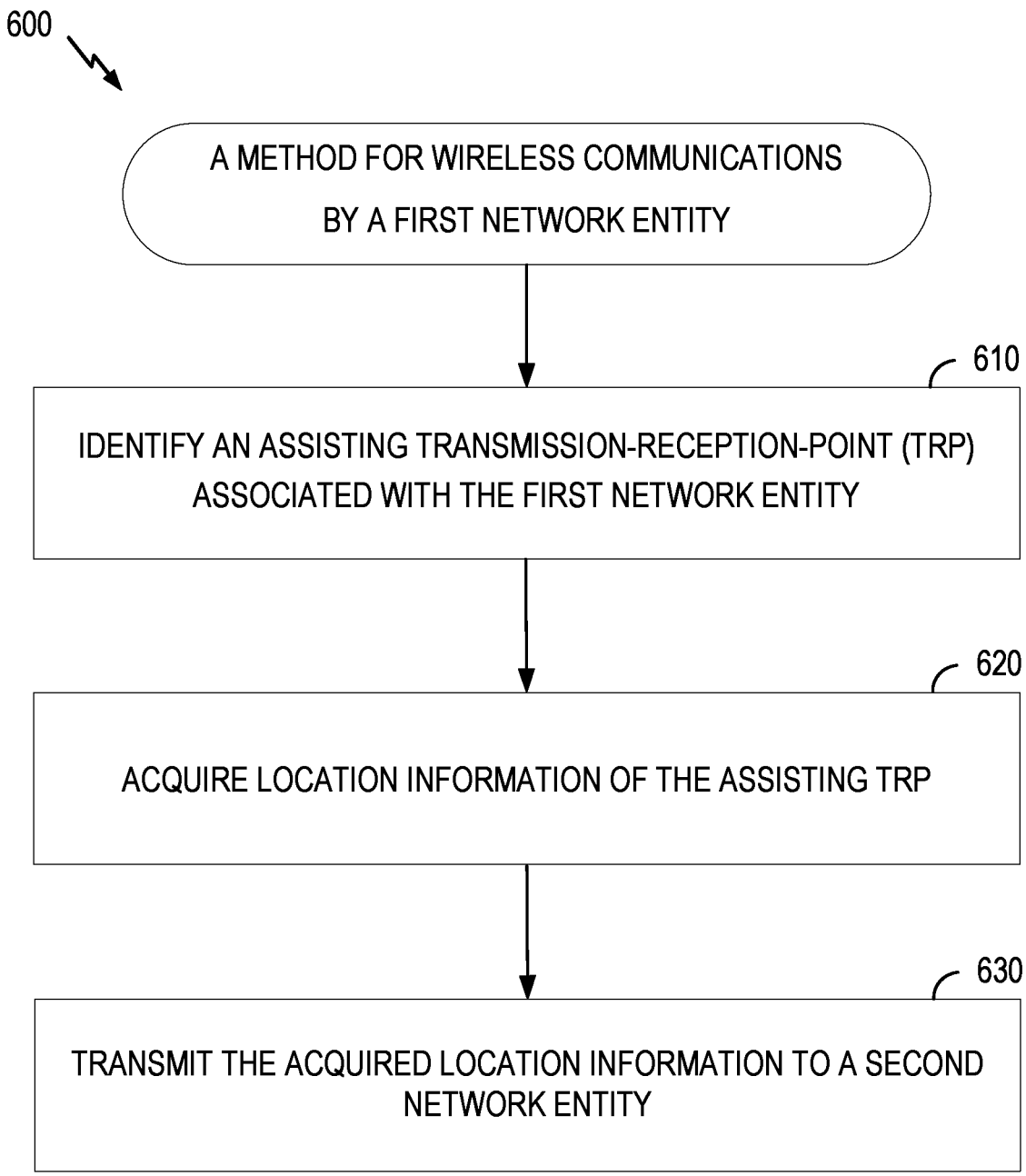
FIG. 6 depicts an example flow diagram for operations by a first network entity.

FIG. 6 is a flow diagram illustrating example operations 600 for wireless communication. The operations 600 may be performed, for example, by a first network entity (e.g., such as the BS 102 in the wireless communication network 100 of FIG. 1). The operations 600 may be implemented as software components that are executed and run on one or more processors (e.g., the controller/processor 240 of FIG. 2). Further, transmission and reception of signals by the network entity in operations 600 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 600 begin, at 610, by identifying an assisting transmission-reception-point (TRP) associated with the first network entity. For example, the network entity may communicate with an assisting TRP using antenna(s) and transmitter/transceiver components of the BS 102 shown in FIG. 1 or FIG. 2 and/or of the apparatus shown in FIG. 8. For example, the first network entity may identify the assisting TRP by receiving a global ID of the assisting TRP. The global ID may be unique in the global network and may assist the first network entity to obtain the location information associated with the assisting TRP. The first network entity may also identify the assisting TRP by receiving an ID of the assisting TRP from an OAM, a TRP RME, or the assisting TRP itself.

At 620, the first network entity acquires location information of the assisting TRP. For example, the first network entity may transmit a request for the location information along with the ID of the assisting TRP to the OAM or RME and receive a response with the location information from the OAM or RME, using similar antenna(s) and transmitter/transceiver components of the BS 102 shown in FIG. 1 or FIG. 2 and/or of the apparatus shown in FIG. 8. In some cases, the location information comprises coordinate information and accuracy information associated with the coordinate information of the location information. The location information may further include at least one of geographical information (e.g., for positioning) or spatial information (for beam forming).

At 630, the first network entity transmits the acquired location information of the assisting TRP to a second network entity. For example, the first network entity or the second network entity comprises at least one of: a CU, a DU, an RME, an LMF, or an OAM. In some cases, transmitting the acquired location information to the second network entity is in response to receiving a request from the second network entity or another network entity.

Figure 7:
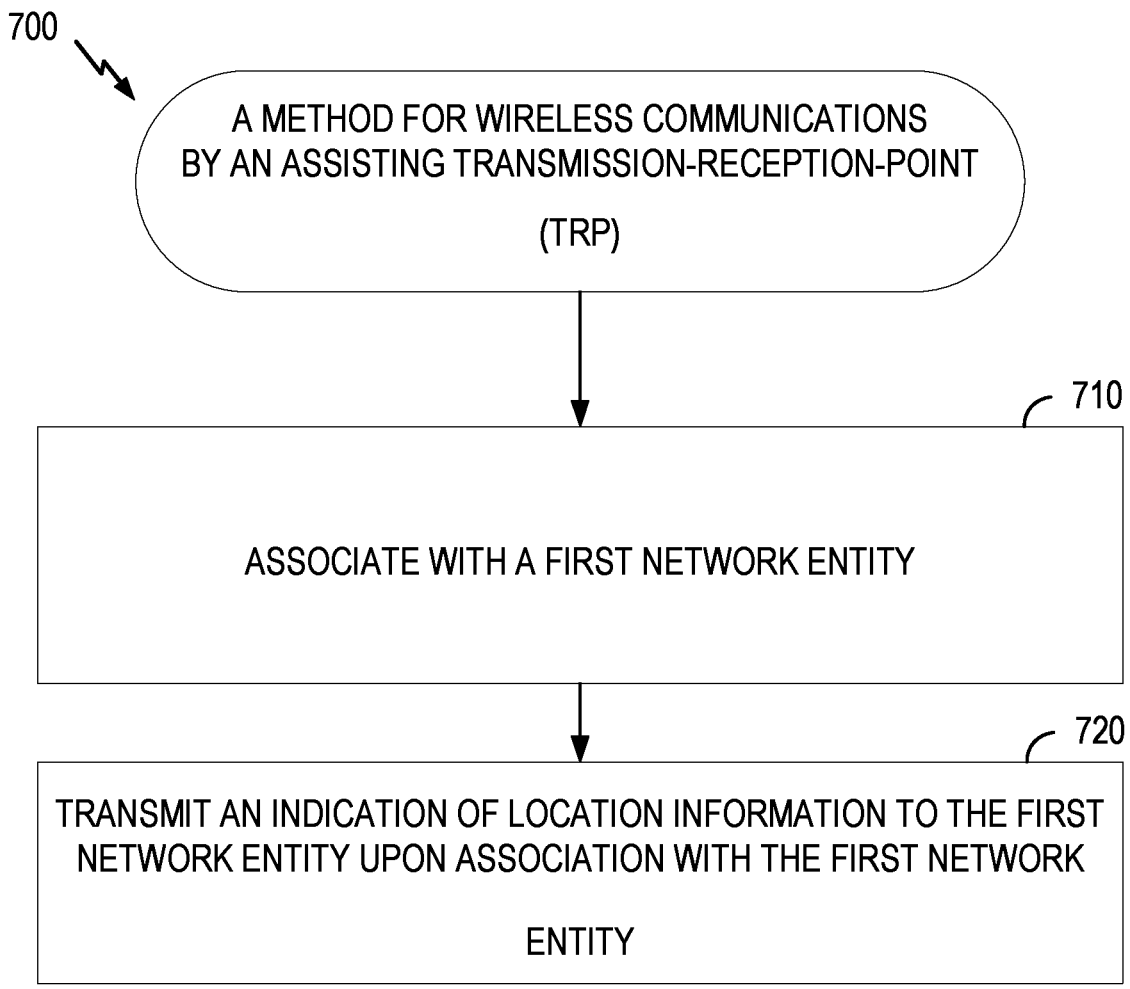
FIG. 7 depicts an example flow diagram for operations by an assisting transmission-reception-point (TRP).

FIG. 7 depicts a flow diagram illustrating example operations 700 for wireless communication. The operations 700 may be performed, for example, by an assisting node or TRP (e.g., such as the BS 180, or the UE 104, in the wireless communication network 100 of FIG. 1). The operations 700 may be complimentary to the operations 600 of FIG. 6.

The operations 700 may be implemented as software components that are executed and run on one or more processors (e.g., the controller/processor 280 of FIG. 2). Further, transmission and reception of signals by the network entity in operations 700 may be enabled, for example, by one or more antennas (e.g., the antennas 252 of FIG. 2). In certain aspects, the transmission and/or reception of signals by the network entity may be implemented via a bus interface of one or more processors (e.g., the controller/processor 280) obtaining and/or outputting signals.

The operations 700 begin, at 710, by associating the assisting TRP with a first network entity. For example, the assisting TRP may transmit an ID or an indication thereof to the first network entity. At 720, the assisting TRP transmits an indication of location information to the first network entity upon associating with first network entity.

In certain aspects, an OAM or an RME in the network may know the location information of the assisting TRP. As such, the assisting TRP may identify itself to the network using a preconfigured unique global ID upon integration to the network. The network may then fetch the location information, as well as other information available, about the assisting TRP from the OAM or RME using the unique global ID. In some cases, the first network entity identifies the assisting TRP using the global ID. In some cases, the first network entity receives the ID from the OAM, the RME, or the assisting TRP itself.

In certain aspects, the assisting TRP is a fixed (e.g., non-mobile) repeater or reflector device, which is preconfigured with a geographical location information at the time of deployment. The assisting TRP may report the preconfigured location information to the network, including CU, DU, OAM, RME, LMF, etc. In some cases, the reporting by the assisting TRP may be in response to a request by one or more other network entities that have not yet been associated with the assisting TRP. In some cases, regardless whether the assisting TRP is fixed or mobile, the assisting TRP may utilize a global positioning system (GPS) or a global navigation satellite system (GNSS), as well as other positioning techniques, to acquire the location information.

In the present disclosure, the location information include at least geographical location information and spatial location information, and accuracy thereof. For example, the geographical location information includes coordinate information (e.g., longitude and latitude). The spatial location information may include azimuth angle and/or elevation angle, and other beamforming information. The location information may also include a level of accuracy associated with the geographical and spatial information.

In certain aspects, there may not be existing location information about the assisting TRP. In such cases, the location information of the assisting TRP may be acquired by employing a location service feature of the first network entity. For example, by using NR location service features, the first network entity may acquire the location of the assisting TRP (e.g., the TRP's mobile termination). In some cases, the first network entity may acquire the location information of the assisting TRP by receiving a lower-layer message from a mobile termination of the assisting TRP. The lower-layer message includes the location information. In some cases, the lower-layer message includes a media access control (MAC) control element (CE).

In certain aspects, to receive the acquired location information, a DU may fetch the information from an OAM or RME. In certain aspects, the CU may transmit an indication of the location information of the assisting TRP to the DU. In some cases, the DU may receive a lower-layer (e.g., MAC CE) message for the assisting TRP's mobile termination to obtain the geographical coordinates.

In certain aspects, the first network entity may receive from the assisting TRP an indication on whether the location information is available therein, e.g., as part of its capability exchange. When the assisting TRP is mobile or otherwise has a varying location, the location information may be updated. For example, the first network entity may receive an indication from the assisting TRP on a change or update of the location information.

In certain aspects, the first network entity acquires spatial information of the assisting TRP and receives from the assisting TRP, the OAM, or the RME, beamforming codebook information associated with the spatial information. The beamforming codebook information may indicate a beam angle for beamforming between the first network entity and the assisting TRP. The beam angle may be at least one of an azimuth angle, or an elevation angle.

In certain aspects, the first network entity may acquire the spatial information of the assisting TRP by receiving from the second network entity an indication of at least one beamforming angle for beamforming by the assisting TRP. The first network entity may then transmit the indication of at least one beamforming angle to the assisting TRP. The assisting TRP may use the indication to create a beam in the indicated angle.

Example Wireless Communication Devices

Figure 8:
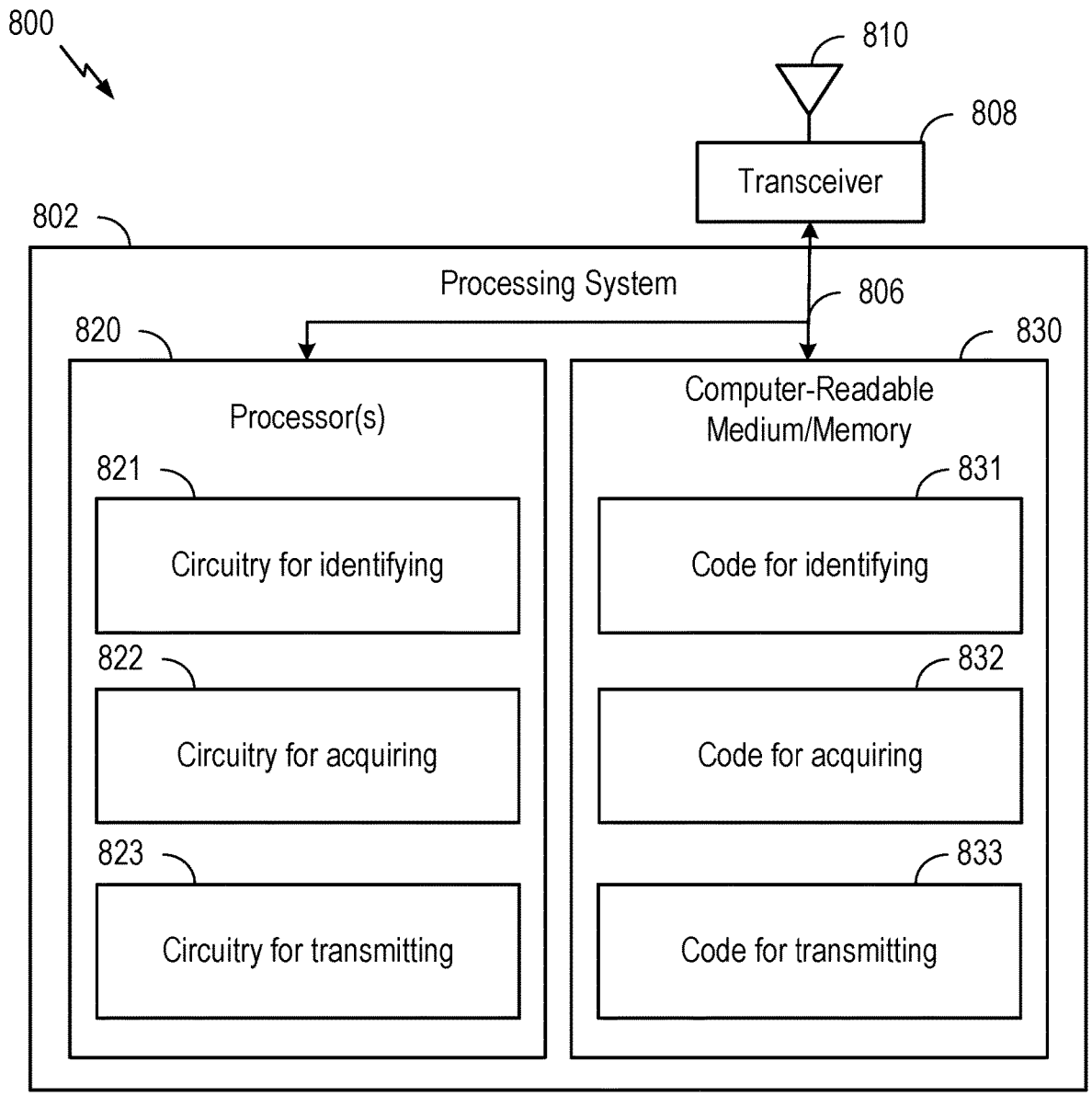
FIG. 8 depicts aspects of an example communications device.

FIG. 8 depicts an example communications device 800 that includes various components operable, configured, or adapted to perform operations for the techniques disclosed herein, such as the operations depicted and described with respect to FIG. 6. In some examples, communication device 800 may be a first network entity, such as the base station 102 as described, for example with respect to FIGS. 1, 2, and 4.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIG. 6, or other operations for performing the various techniques discussed herein for exchanging TRP information.

In the depicted example, computer-readable medium/memory 830 stores code 831 for identifying, code 832 for acquiring, and code 833 for transmitting.

In the depicted example, the one or more processors 820 include circuitry configured to implement the code stored in the computer-readable medium/memory 830, including circuitry 821 for identifying, circuitry 822 for acquiring, and circuitry 823 for transmitting.

Various components of communications device 800 may provide means for performing the methods described herein, including with respect to FIG. 6.

In some examples, means for transmitting or sending (or means for outputting for transmission) may include the transceivers 232 and/or antenna(s) 234 of the base station 102 illustrated in FIG. 2 and/or transceiver 808 and antenna 810 of the communication device 800 in FIG. 8.

In some examples, means for receiving (or means for obtaining/acquiring) may include the transceivers 232 and/or antenna(s) 234 of the base station illustrated in FIG. 2 and/or transceiver 808 and antenna 810 of the communication device 800 in FIG. 8.

In some examples, means for identifying and/or acquiring may include various processing system components, such as: the one or more processors 820 in FIG. 8, or aspects of the base station 102 depicted in FIG. 2, including receive processor 238, transmit processor 220, TX MIMO processor 230, and/or controller/processor 240 (including the location information manager 241).

Notably, FIG. 8 is an example, and many other examples and configurations of communication device 800 are possible.

Figure 9:
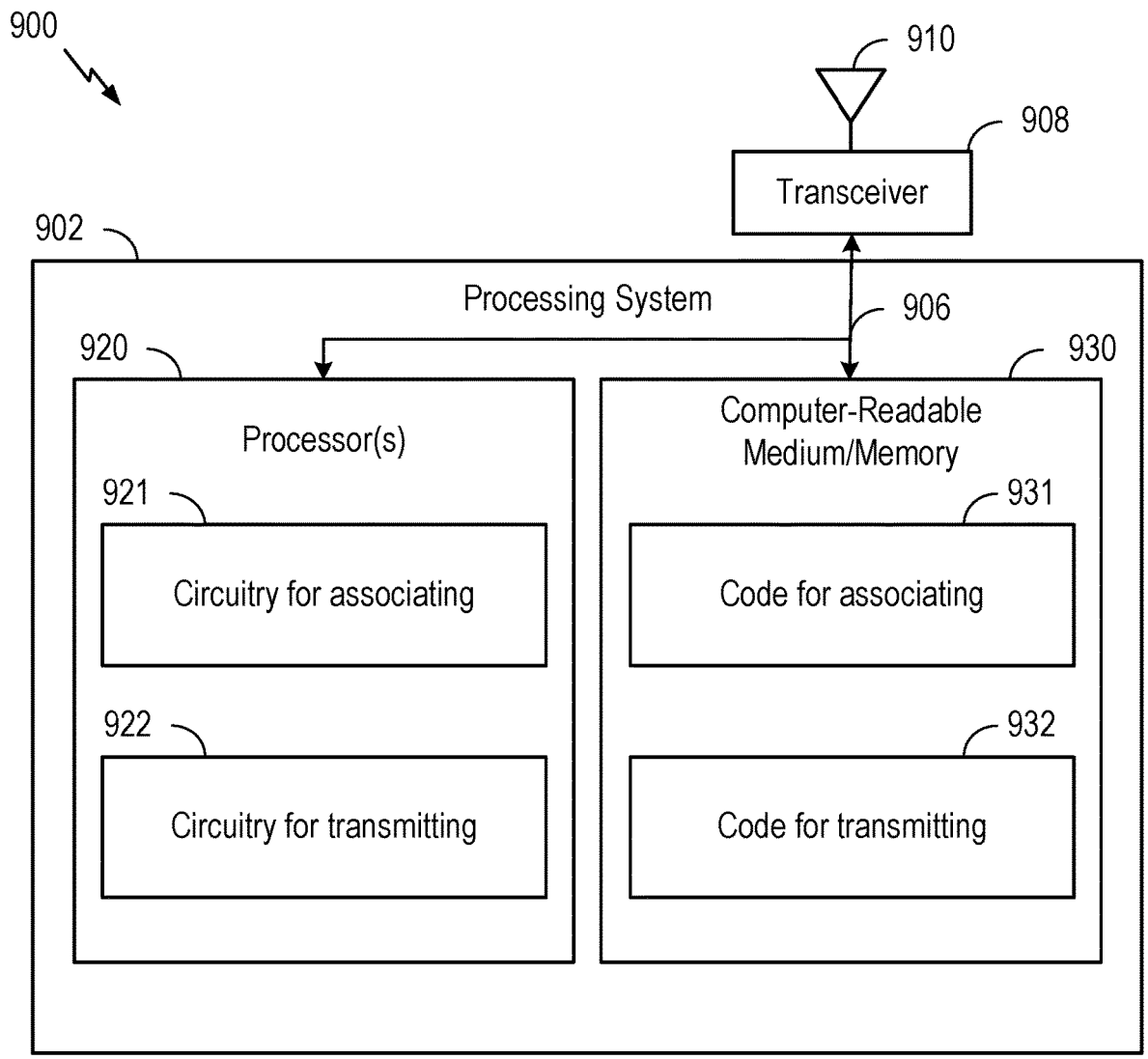
FIG. 9 depicts aspects of an example communications device.

FIG. 9 depicts an example communications device 900 that includes various components operable, configured, or adapted to perform operations for the techniques disclosed herein, such as the operations depicted and described with respect to FIG. 7. In some examples, communication device 900 may be an assisting TRP, such as another base station 180 or a UE 104 as described, for example with respect to FIGS. 1, and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIG. 7, or other operations for performing the various techniques discussed herein for exchanging TRP information.

In the depicted example, computer-readable medium/memory 930 stores code 931 for associating, and code 932 for transmitting.

In the depicted example, the one or more processors 920 include circuitry configured to implement the code stored in the computer-readable medium/memory 930, including circuitry 921 for associating, and circuitry 922 for transmitting.

Various components of communications device 900 may provide means for performing the methods described herein, including with respect to FIG. 7.

In some examples, means for transmitting or sending (or means for outputting for transmission) may include the transceivers 254 and/or antenna(s) 252 of the base station 102 illustrated in FIG. 2 and/or transceiver 908 and antenna 910 of the communication device 900 in FIG. 9.

In some examples, means for receiving (or means for obtaining) may include the transceivers 254 and/or antenna(s) 252 of the base station 102 illustrated in FIG. 2 and/or transceiver 908 and antenna 910 of the communication device 900 in FIG. 9.

In some examples, means for associating may include various processing system components, such as: the one or more processors 920 in FIG. 9, or aspects of the base station 102 depicted in FIG. 2, including receive processor 258, transmit processor 264, TX MIMO processor 266, and/or controller/processor 280.

Notably, FIG. 9 is an example, and many other examples and configurations of communication device 900 are possible.

EXAMPLE CLAUSES

Implementation examples are described in the following numbered clauses:

Clause 1: A method for wireless communications by a first network entity, comprising: identifying an assisting transmission-reception-point (TRP) associated with the first network entity; acquiring location information of the assisting TRP; and transmitting the acquired location information to a second network entity.

Clause 2: The method of Clause 1, wherein the assisting TRP comprises a signal repeater or a signal reflector.

Clause 3: The method of Clause 2, wherein identifying the assisting TRP comprises receiving, from the assisting TRP, a global identifier (ID) of the assisting TRP, wherein the ID of the assisting TRP enables the first network entity to obtain the location information associated with the assisting TRP.

Clause 4: The method of Clause 2, wherein identifying the assisting TRP comprises receiving an identifier (ID) of the assisting TRP from an operations, administration, and maintenance (OAM) function, a TRP management entity (RME), or the assisting TRP itself, wherein the ID of the assisting TRP corresponds to the location information associated with the assisting TRP stored in the OAM or the RME.

Clause 5: The method of Clause 1, wherein the first network entity or the second network entity comprises at least one of: a control unit (CU), a distributed unit (DU), a repeater or reflector management entity (RME), a location management function (LMF), or an operations, administration, and maintenance (OAM).

Clause 6: The method of Clause 5, wherein transmitting the acquired location information to the second network entity is in response to receiving a request from the second network entity or another network entity.

Clause 7: The method of Clause 1, wherein the location information comprises coordinate information and accuracy information associated with the coordinate information of the location information, wherein the location information further comprises at least one of geographical information or spatial information.

Clause 8: The method of Clause 1, wherein acquiring the location information of the assisting TRP comprises: employing a location service feature of the first network entity.

Clause 9: The method of Clause 1, wherein acquiring the location information of the assisting TRP comprises: receiving a lower-layer message from a mobile termination (MT) of the assisting TRP, wherein the lower-layer message comprises the location information.

Clause 10: The method of Clause 9, wherein the lower-layer message comprises a media access control (MAC) control element (CE).

Clause 11: The method of Clause 1, further comprising: receiving an indication from the assisting TRP on whether the location information is available therein.

Clause 12: The method of Clause 1, further comprising: receiving an indication from the assisting TRP on a change of the location information.

Clause 13: The method of Clause 1, wherein acquiring the location information of the assisting TRP comprises: acquiring spatial information of the assisting TRP; and receiving, from the assisting TRP, an operations, administration, and maintenance (OAM), or a repeater or reflector management entity (RME), beamforming codebook information associated with the spatial information, wherein the beamforming codebook information indicates a beam angle for beamforming between the first network entity and the assisting TRP.

Clause 14: The method of Clause 1, wherein acquiring the location information of the assisting TRP comprises: acquiring spatial information of the assisting TRP; receiving, from the second network entity, an indication of at least one beamforming angle for beamforming by the assisting TRP; and transmitting the indication of at least one beamforming angle to the assisting TRP.

Clause 15: A method for wireless communications by an assisting transmission-reception-point (TRP), comprising: associating with a first network entity; and transmitting an indication of location information to the first network entity upon association with the first network entity.

Clause 16: The method of Clause 15, wherein the indication comprises a preconfigured global identifier.

Clause 17: The method of Clause 16, wherein the preconfigured global identifier enables the first network entity to fetch the location information from a TRP management entity.

Clause 18: The method of Clause 15, wherein the location information of the assisting TRP comprises at least one of geographical information or spatial information.

Clause 19: The method of Clause 15, wherein the first network entity comprises at least one of: a control unit (CU), a distributed unit (DU), a repeater or reflector management entity (RME), a location management function (LMF), or an operations, administration, and maintenance (OAM).

Clause 20: The method of Clause 15, wherein transmitting the indication of the location information of the assisting TRP to the first network entity is caused by a request transmitted by the first network entity.

Clause 21: The method of Clause 15, wherein the location information comprises coordinate information and accuracy information associated with the coordinate information.

Clause 22: The method of Clause 15, wherein the indication of the location information comprises preconfigured geographical location information at time of deployment.

Clause 23: The method of Clause 15, wherein the indication of the location information comprises geographical location information acquired from a global positioning system (GPS) or acquired by a location service feature of the first network entity.

Clause 24: The method of Clause 15, further comprising transmitting the indication of the location information to a second network entity.

Clause 25: The method of Clause 15, further comprising at least one of: transmitting an indication to the first network entity on whether the location information is available in the assisting TRP; or transmitting an update to the first network entity to indicate a change of the location information.

Clause 26: The method of Clause 15, wherein transmitting an indication of location information to the first network entity comprises: acquiring spatial information of the assisting TRP; and transmitting, to the first network entity, beamforming codebook information associated with the spatial information, wherein the beamforming codebook information indicates a beam angle for beamforming between the first network entity and the assisting TRP.

Clause 27: The method of Clause 15, wherein transmitting the indication of the location information of the assisting TRP comprises: transmitting a lower-layer message by a mobile termination (MT) of the assisting TRP to the first network entity, wherein the lower-layer message comprises the location information.

Clause 28: The method of Clause 15, further comprising: receiving an indication of at least one beamforming angle from the first network entity, wherein the first network entity receives the indication of the at least one beamforming angle from a second network entity; and forming a beam based on the at least one beamforming angle.

Clause 29: An apparatus, comprising: a memory comprising executable instructions; one or more processors configured to execute the executable instructions and cause the apparatus to perform a method in accordance with any one of Clauses 1-14.

Clause 30: An apparatus, comprising means for performing a method in accordance with any one of Clauses 1-14.

Clause 31: A non-transitory computer-readable medium comprising executable instructions that, when executed by one or more processors of an apparatus, cause the apparatus to perform a method in accordance with any one of Clauses 1-14.

Clause 32: A computer program product embodied on a computer-readable storage medium comprising code for performing a method in accordance with any one of Clauses 1-14.

Clause 33: An apparatus, comprising: a memory comprising executable instructions; one or more processors configured to execute the executable instructions and cause the apparatus to perform a method in accordance with any one of Clauses 15-28.

Clause 34: An apparatus, comprising means for performing a method in accordance with any one of Clauses 15-28.

Clause 35: A non-transitory computer-readable medium comprising executable instructions that, when executed by one or more processors of an apparatus, cause the apparatus to perform a method in accordance with any one of Clauses 15-28.

Clause 36: A computer program product embodied on a computer-readable storage medium comprising code for performing a method in accordance with any one of Clauses 15-28.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 232a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of exchanging transmission-reception-point (TRP) information in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first network entity for wireless communications comprising one or more memories, and one or more processors coupled to the one or more memories and configured to:
   identify an assisting transmission-reception-point (TRP) associated with the first network entity;
   acquire location information of the assisting TRP; and
   transmit the acquired location information to a second network entity,
   wherein to acquire the location information of the assisting TRP, the one or more processors are configured to:
      acquire spatial information of the assisting TRP; and
      receive, from the assisting TRP, an operations, administration, and maintenance (OAM) or a repeater or reflector management entity (RME), beamforming codebook information associated with the spatial information, wherein the beamforming codebook information indicates a beam angle for beamforming between the first network entity and the assisting TRP; or
      receive, from the second network entity, an indication of at least one beamforming angle for beamforming by the assisting TRP.

2. The first network entity of claim 1, wherein the assisting TRP comprises a signal repeater or a signal reflector.

3. The first network entity of claim 2, wherein to identify the assisting TRP, the one or more processors are configured to receive, from the assisting TRP, a global identifier (ID) of the assisting TRP, wherein the ID of the assisting TRP enables the first network entity to obtain the location information associated with the assisting TRP.

4. The first network entity of claim 2, wherein to identify the assisting TRP, the one or more processors are configured to receive an identifier (ID) of the assisting TRP from an operations, administration, and maintenance (OAM) function, a TRP management entity (RME) or the assisting TRP itself, wherein the ID of the assisting TRP corresponds to the location information associated with the assisting TRP stored in the OAM or the RME.

5. The first network entity of claim 1, wherein the first network entity or the second network entity comprises at least one of: a central unit (CU), a distributed unit (DU), a repeater or reflector management entity (RME), a location management function (LMF), or an operations, administration, and maintenance (OAM).

6. The first network entity of claim 5, wherein the one or more processors are configured to transmit the acquired location information to the second network entity in response to a request from the second network entity or another network entity.

7. The first network entity of claim 5, wherein:
   the first network entity comprises an OAM or RME; and
   the second network entity comprises a DU.

8. The first network entity of claim 5, wherein:
   the first network entity comprises a CU; and
   the second network entity comprises a DU.

9. The first network entity of claim 1, wherein the location information comprises coordinate information and accuracy information associated with the coordinate information of the location information, wherein the location information further comprises at least one of geographical information or spatial information.

10. The first network entity of claim 1, wherein to acquire the location information of the assisting TRP, the one or more processors are configured to:
employ a location service feature of the first network entity.

11. The first network entity of claim 1, wherein to acquire the location information of the assisting TRP, the one or more processors are configured to:
receive a lower-layer message from a mobile termination (MT) of the assisting TRP, wherein the lower-layer message comprises the location information.

12. The first network entity of claim 11, wherein the lower-layer message comprises a media access control (MAC) control element (CE).

13. The first network entity of claim 1, wherein the one or more processors are configured to:
receive an indication from the assisting TRP on whether the location information is available therein.

14. The first network entity of claim 1, wherein the one or more processors are configured to:
receive an indication from the assisting TRP on a change of the location information.

15. The first network entity of claim 1, wherein to acquire the location information of the assisting TRP, the one or more processors are configured to:
acquire the spatial information of the assisting TRP; and
receive, from the assisting TRP, the OAM or the RME, the beamforming codebook information associated with the spatial information, wherein the beamforming codebook information indicates the beam angle for the beamforming between the first network entity and the assisting TRP.

16. The first network entity of claim 1, wherein to acquire the location information of the assisting TRP, the one or more processors are configured to:
acquire the spatial information of the assisting TRP; and
receive, from the second network entity, the indication of the at least one beamforming angle for the beamforming by the assisting TRP.

17. The first network entity of claim 16, wherein the one or more processors are configured to: transmit the indication of the at least one beamforming angle to the assisting TRP.

18. An assisting transmission-reception-point (TRP) for wireless communications comprising one or more memories, and one or more processors coupled to the one or more memories and configured to:
associate with a first network entity; and
transmit an indication of location information to the first network entity upon association with the first network entity,
wherein:
to transmit an indication of location information to the first network entity, the one or more processors are configured to acquire spatial information of the assisting TRP and transmit, to the first network entity, beamforming codebook information associated with the spatial information, wherein the beamforming codebook information indicates a beam angle for beamforming between the first network entity and the assisting TRP; or the one or more processors are configured to: receive an indication of at least one beamforming angle from the first network entity that received the indication of the at least one beamforming angle from a second network entity; and form a beam based on the at least one beamforming angle.

19. The assisting TRP of claim 18, wherein the indication comprises a preconfigured global identifier.

20. The assisting TRP of claim 19, wherein the preconfigured global identifier enables the first network entity to fetch the location information from a TRP management entity.

21. The assisting TRP of claim 18, wherein the location information of the assisting TRP comprises at least one of geographical information or spatial information.

22. The assisting TRP of claim 18, wherein the first network entity comprises at least one of: a central unit (CU), a distributed unit (DU), a repeater or reflector management entity (RME), a location management function (LMF), or an operations, administration, and maintenance (OAM).

23. The assisting TRP of claim 18, wherein the one or more processors are configured to transmit the indication of the location information of the assisting TRP to the first network entity based on a request transmitted by the first network entity.

24. The assisting TRP of claim 18, wherein the location information comprises coordinate information and accuracy information associated with the coordinate information.

25. The assisting TRP of claim 18, wherein the indication of the location information comprises preconfigured geographical location information at time of deployment.

26. The assisting TRP of claim 18, wherein the indication of the location information comprises geographical location information acquired from a global positioning system (GPS) or acquired by a location service feature of the first network entity.

27. The assisting TRP of claim 18, wherein the one or more processors are configured to transmit the indication of the location information to the second network entity.

28. The assisting TRP of claim 18, wherein the one or more processors are configured to at least one of:
transmit an indication to the first network entity on whether the location information is available in the assisting TRP; or
transmit an update to the first network entity to indicate a change of the location information.

29. The assisting TRP of claim 18, wherein to transmit an indication of location information to the first network entity, the one or more processors are configured to:
acquire spatial information of the assisting TRP; and
transmit, to the first network entity, the beamforming codebook information associated with the spatial information, wherein the beamforming codebook information indicates the beam angle for the beamforming between the first network entity and the assisting TRP.

30. The assisting TRP of claim 18, wherein to transmit the indication of the location information of the assisting TRP, the one or more processors are configured to:
transmit a lower-layer message by a mobile termination (MT) of the assisting TRP to the first network entity, wherein the lower-layer message comprises the location information.

31. The assisting TRP of claim 18, wherein the one or more processors are configured to:
receive the vindication of the at least one beamforming angle from the first network entity that received the indication of the at least one beamforming angle from the second network entity; and form a beam based on the at least one beamforming angle.

32. A method for wireless communications by a first network entity, comprising:

identifying an assisting transmission-reception-point (TRP) associated with the first network entity;

acquiring location information of the assisting TRP; and transmitting the acquired location information to a second network entity, wherein acquiring the location information of the assisting TRP comprises:

acquiring spatial information of the assisting TRP; and receiving, from the assisting TRP, an operations, administration, and maintenance (OAM) or a repeater or reflector management entity (RME), beamforming codebook information associated with the spatial information, wherein the beamforming codebook information indicates a beam angle for beamforming between the first network entity and the assisting TRP; or receiving, from the second network entity, an indication of at least one beamforming angle for beamforming by the assisting TRP.

33. The method of claim 32, wherein acquiring the location information of the assisting TRP comprises:

acquiring the spatial information of the assisting TRP; and receiving, from the assisting TRP, the OAM or the RME, the beamforming codebook information associated with the spatial information, wherein the beamforming codebook information indicates the beam angle for the beamforming between the first network entity and the assisting TRP.

34. The method of claim 32, wherein acquiring the location information of the assisting TRP comprises:

acquiring the spatial information of the assisting TRP; and receiving, from the second network entity, the indication of the at least one beamforming angle for the beamforming by the assisting TRP.

35. The method of claim 34, wherein the method comprises: transmitting the indication of the at least one beamforming angle to the assisting TRP.

36. The method of claim 32, wherein:

the first network entity comprises an OAM or RME; and the second network entity comprises a distributed unit (DU).

37. The method of claim 32, wherein:

the first network entity comprises a central unit (CU); and the second network entity comprises a distributed unit (DU).

38. A method for wireless communications by an assisting transmission-reception-point (TRP), comprising:

associating with a first network entity; and transmitting an indication of location information to the first network entity upon association with the first network entity, wherein:

transmitting the indication of location information to the first network entity comprises acquiring spatial information of the assisting TRP and transmitting, to the first network entity, beamforming codebook information associated with the spatial information, wherein the beamforming codebook information indicates a beam angle for beamforming between the first network entity and the assisting TRP; or the method further comprises: receiving an indication of at least one beamforming angle from the first network entity that received the indication of the at least one beamforming angle from a second network entity; and forming a beam based on the at least one beamforming angle.

39. The method of claim 38, wherein transmitting an indication of location information to the first network entity comprises:

acquiring spatial information of the assisting TRP; and transmitting, to the first network entity, the beamforming codebook information associated with the spatial information, wherein the beamforming codebook information indicates the beam angle for the beamforming between the first network entity and the assisting TRP.

40. The method of claim 38, further comprising:

receiving the indication of the at least one beamforming angle from the first network entity that received the indication of the at least one beamforming angle from the second network entity; and form a beam based on the at least one beamforming angle.

* * * * *